(12) United States Patent
Guo et al.

(10) Patent No.: US 11,987,281 B2
(45) Date of Patent: May 21, 2024

(54) WHEELED CARRYING APPARATUS

(71) Applicant: Wonderland Switzerland AG, Steinhausen (CH)

(72) Inventors: Zheng-Wen Guo, Dongguan (CN); Er Xue Wang, Dongguan (CN); Shoufeng Hu, Dongguan (CN); Mingxing Sun, Dongguan (CN); Cheng-Nan Chiang, Taichung (TW)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/743,338

(22) Filed: May 12, 2022

(65) Prior Publication Data
US 2022/0266887 A1 Aug. 25, 2022

Related U.S. Application Data

(63) Continuation of application No. 17/017,357, filed on Sep. 10, 2020, now Pat. No. 11,358,624.

(30) Foreign Application Priority Data

Sep. 11, 2019 (CN) .......................... 201910858955.3
Apr. 30, 2020 (CN) .......................... 202010370191.6

(51) Int. Cl.
B62B 9/08 (2006.01)
B62B 9/12 (2006.01)
(52) U.S. Cl.
CPC . *B62B 9/08* (2013.01); *B62B 9/12* (2013.01)
(58) Field of Classification Search
CPC ........... B62B 9/08; B62B 9/085; B62B 9/087; B62B 5/0438; B62B 7/042; B60B 33/026
See application file for complete search history.

(56) References Cited

U.S. PATENT DOCUMENTS 4,349,938 A * 9/1982 Fontana ................ B60B 33/021
16/35 R
4,779,879 A 10/1988 Kassai
(Continued)

FOREIGN PATENT DOCUMENTS

CA 2756004 A1 10/2010
CA 2820031 A1 12/2013
(Continued)

OTHER PUBLICATIONS

Office Action dated Jun. 7, 2022 on Japanese counterpart 2020-102214 along with English translations thereof.
(Continued)

*Primary Examiner* — Jeffrey J Restifo
(74) *Attorney, Agent, or Firm* — HAUPTMAN HAM, LLP

(57) ABSTRACT

A wheeled carrying apparatus includes a handle frame rotatable relative to a standing frame between a first and a second position, a wheel mount pivotally connected with the standing frame, a wheel mount latch adapted to lock and unlock the wheel mount with respect to the standing frame, an actuating assembly coupling the wheel mount latch to the handle frame so that the wheel mount latch is movable to engage and disengage the wheel mount in response to a rotation of the handle frame, and a release mechanism including an operating part that is coupled to the actuating assembly via a cable assembly. The cable assembly includes a flexible part configured to stretch or loosen as the handle frame rotates between the two positions, the operating part being operable to cause the wheel mount latch to disengage from the wheel mount when the handle frame is in the first position.

27 Claims, 12 Drawing Sheets

(56) References Cited

U.S. PATENT DOCUMENTS

| | | | | |
|---|---|---|---|---|
| 4,997,066 | A * | 3/1991 | Bigo | B62B 9/082 |
| | | | | 188/69 |
| 5,125,676 | A * | 6/1992 | Teng | B60B 33/0015 |
| | | | | 280/47.38 |
| 5,351,364 | A * | 10/1994 | Zun | B60B 33/025 |
| | | | | 16/35 R |
| 6,212,733 | B1 * | 4/2001 | Yeh | B60B 33/0068 |
| | | | | 16/35 R |
| 6,315,309 | B1 * | 11/2001 | Li | B62B 7/08 |
| | | | | 280/47.38 |
| 7,083,175 | B1 * | 8/2006 | Liu | B60B 33/0073 |
| | | | | 280/47.38 |
| 7,210,690 | B2 * | 5/2007 | Tan | B62B 7/04 |
| | | | | 280/47.38 |
| 7,273,225 | B2 | 9/2007 | Yeh | |
| 7,490,848 | B2 * | 2/2009 | Wu | B62B 7/04 |
| | | | | 280/47.38 |
| 7,922,182 | B2 * | 4/2011 | Van der Vegt | B62B 9/20 |
| | | | | 280/47.39 |
| 8,328,226 | B2 * | 12/2012 | Xu-Hui | B62B 7/042 |
| | | | | 280/658 |
| 8,991,854 | B2 * | 3/2015 | Greger | B62B 3/022 |
| | | | | 280/650 |
| 9,044,656 | B2 * | 6/2015 | Zhang | B62B 3/12 |
| 9,254,858 | B2 | 2/2016 | Shellenberger | |
| 9,592,846 | B1 * | 3/2017 | Hanson | B62B 7/068 |
| 9,707,987 | B2 * | 7/2017 | Hanson | B62B 7/068 |
| 11,254,342 | B2 | 2/2022 | Kalinowski et al. | |
| 11,358,624 | B2 * | 6/2022 | Guo | B62B 9/12 |
| 11,479,285 | B2 * | 10/2022 | Guo | B62B 9/08 |
| 2003/0204933 | A1 * | 11/2003 | Yeh | B60B 33/026 |
| | | | | 16/35 R |
| 2004/0226134 | A1 * | 11/2004 | Chen | B60B 1/006 |
| | | | | 16/35 R |
| 2005/0194755 | A1 * | 9/2005 | Lan | B62B 7/042 |
| | | | | 280/47.38 |
| 2006/0071452 | A1 | 4/2006 | Yeh | |
| 2007/0013156 | A1 | 1/2007 | Wu et al. | |
| 2007/0085304 | A1 | 4/2007 | Yeh | |
| 2010/0109271 | A1 * | 5/2010 | Funakura | B62B 9/20 |
| | | | | 280/47.36 |
| 2010/0127481 | A1 * | 5/2010 | Funakura | B62B 9/20 |
| | | | | 280/658 |
| 2010/0259022 | A1 * | 10/2010 | Zhong | B60B 33/0042 |
| | | | | 280/47.34 |
| 2011/0285110 | A1 * | 11/2011 | Xu-Hui | B62B 9/203 |
| | | | | 280/650 |
| 2012/0043730 | A1 * | 2/2012 | Walther | B62K 5/05 |
| | | | | 280/62 |
| 2012/0056393 | A1 | 3/2012 | Funakura | |
| 2012/0326418 | A1 | 12/2012 | Ohnishi | |
| 2013/0069329 | A1 * | 3/2013 | Chaudeurge | B62B 9/08 |
| | | | | 280/86 |
| 2017/0057284 | A1 * | 3/2017 | Wang | B62B 3/001 |
| 2017/0066465 | A1 * | 3/2017 | Hanson | B62B 7/068 |
| 2018/0065655 | A1 * | 3/2018 | Leys | B62B 7/064 |
| 2020/0391783 | A1 * | 12/2020 | Zheng | B62B 9/20 |
| 2021/0046968 | A1 * | 2/2021 | Zheng | B62B 9/085 |
| 2021/0070344 | A1 * | 3/2021 | Guo | B62B 9/203 |
| 2022/0009538 | A1 * | 1/2022 | Guo | B62B 7/04 |
| 2023/0059506 | A1 | 2/2023 | Wu et al. | |

FOREIGN PATENT DOCUMENTS

| | | |
|---|---|---|
| CN | 1031204 A | 2/1989 |
| CN | 101678852 A | 3/2010 |
| CN | 101687518 A | 3/2010 |
| CN | 201646809 U | 11/2010 |
| CN | 201761521 U | 3/2011 |
| CN | 201923194 U | 8/2011 |
| CN | 102248961 A | 11/2011 |
| CN | 102923174 A | 2/2013 |
| CN | 202753995 U | 2/2013 |
| CN | 203111278 U | 8/2013 |
| CN | 203681630 U | 7/2014 |
| CN | 104044623 A | 9/2014 |
| CN | 104118462 A | 10/2014 |
| CN | 203888857 U | 10/2014 |
| CN | 203946141 U | 11/2014 |
| CN | 104176105 A | 12/2014 |
| CN | 104781132 A | 7/2015 |
| CN | 204871148 U | 12/2015 |
| CN | 204956578 U | 1/2016 |
| CN | 205632637 U | 10/2016 |
| CN | 106143581 A | 11/2016 |
| CN | 206351703 U | 7/2017 |
| CN | 206885123 U | 1/2018 |
| CN | 207293586 U | 5/2018 |
| CN | 108820029 A | 11/2018 |
| CN | 109305211 A | 2/2019 |
| CN | 208915235 U | 5/2019 |
| CN | 110834664 A | 2/2020 |
| CN | 110901746 A | 3/2020 |
| EP | 2946985 A1 | 11/2015 |
| EP | 2946985 B1 | 4/2018 |
| JP | 08067255 | 3/1996 |
| JP | H0867255 A | 3/1996 |
| JP | H09109604 A | 4/1997 |
| JP | 2002284015 A | 10/2002 |
| JP | 2003054209 A | 2/2003 |
| JP | 3196047 U | 1/2015 |
| JP | 2017081252 A | 5/2017 |
| JP | 2019077268 A | 5/2019 |
| JP | 2019131025 A | 8/2019 |
| TW | 589261 B | 6/2004 |
| TW | M245120 U | 10/2004 |
| TW | 201043510 A | 12/2010 |
| TW | I434783 B | 4/2014 |
| TW | 201710135 A | 3/2017 |
| TW | 201711890 A | 4/2017 |
| TW | 201914878 A | 4/2019 |
| WO | 2013149642 A1 | 10/2013 |

OTHER PUBLICATIONS

Office Action dated May 30, 2022 on Indian counterpart 202217009677.
International Search Report issued in corresponding International Application No. PCT/EP2020/075385, dated Mar. 12, 2021, pp. 1-5.
Chinese First Office Action issued in corresponding Chinese Application No. 201910787608.6, dated May 8, 2021, pp. 1-15.
Chinese Second Office Action issued in corresponding Chinese Application No. 201910787608.6, dated Jan. 29, 2022, pp. 1-15.
Chinese Third Office Action issued in corresponding Chinese Application No. 201910787608.6, dated Apr. 18, 2022, pp. 1-11.
Chinese First Office Action issued in corresponding Chinese Application No. 202010950012.6, dated Aug. 2, 2022, pp. 1-23.
Taiwan First Office Action issued in corresponding Taiwan Application No. 112100025, dated Mar. 3, 2023, pp. 1-13.
Taiwan First Office Action issued in corresponding Taiwan Application No. 111137931, dated Jan. 30, 2023, pp. 1-6.
Taiwan First Office Action issued in corresponding Taiwan Application No. 111116957, dated Jul. 5, 2022, pp. 1-6.
Taiwan First Office Action issued in corresponding Taiwan Application No. 109141101, dated Jul. 5, 2021, pp. 1-12.
Taiwan First Office Action issued in corresponding Taiwan Application No. 109131083, dated Oct. 13, 2021, pp. 1-30.
Non-Final Office Action issued in corresponding U.S. Appl. No. 16/899,581 dated Aug. 2, 2022, pp. 1-10.
Taiwan First Office Action issued in corresponding Taiwan Application No. 109131084, dated Oct. 1, 2021, pp. 1-9.
European Second Office Action issued in corresponding European Application No. 20179828.7, dated Oct. 5, 2022, pp. 1-4.
European First Office Action issued in corresponding European Application No. 20195526.7, dated Oct. 26, 2022, pp. 1-4.
Japanese 1st Notice of Reasons for Refusal issued in corresponding Japanese Application No. 2020-102214, dated Aug. 30, 2021, pp. 1-6.
Japanese 2nd Notice of Reasons for Refusal issued in corresponding Japanese Application No. 2020-102214, dated Jun. 13, 2022, pp. 1-8.

(56) References Cited

OTHER PUBLICATIONS

Japanese 1st Notice of Reasons for Refusal issued in corresponding Japanese Application No. 2020-151702, dated Jun. 29, 2021, pp. 1-6.
Canadian First Office Action issued in corresponding Canadian Application No. 3,151,487, dated Mar. 28, 2023, pp. 1-5.
Non-Final Office Action issued in corresponding U.S. Appl. No. 17/945,323 dated Jun. 23, 2023, pp. 1-16.
Chinese Third Office Action issued in corresponding Chinese Application No. 202010950012.6, dated Sep. 27, 2023, pp. 1-12.
Japanese Office Action issued in corresponding Japanese Application No. 2023-024357, dated Oct. 31, 2023, pp. 1-8.

* cited by examiner

WHEELED CARRYING APPARATUS

CROSS-REFERENCE TO RELATED APPLICATION(S)

This application is a continuation application of U.S. patent application Ser. No. 17/017,357 filed on Sep. 10, 2020, which respectively claims priority to China patent application no. 201910858955.3 filed on Sep. 11, 2019, and to China patent application no. 202010370191.6 filed on Apr. 30, 2020.

BACKGROUND

1. Field of the Invention

The present invention relates to wheeled carrying apparatuses.

2. Description of the Related Art

Caregivers usually rely on a stroller apparatus to transport babies and children. Most stroller apparatuses typically have front wheels that can freely rotate horizontally relative to the stroller frame for changing the orientation of the wheel axes, and rear wheels that cannot rotate horizontally and have a fixed wheel axis oriented transversally. As a result, it may not be easy for the stroller apparatus to turn around in an environment of limited space.

Therefore, there is a need for an improved design that can offer better maneuverability and address at least the foregoing issues.

SUMMARY

The present application describes a wheeled carrying apparatus having wheel assemblies that can be controllably locked and unlocked in horizontal orientation and can offer better maneuverability.

According to one embodiment, a wheeled carrying apparatus includes: a standing frame and a handle frame pivotally coupled to each other, the handle frame being rotatable relative to the standing frame between a first position and a second position of different inclinations; a wheel mount carrying a wheel and pivotally connected with the standing frame, the wheel being rotatable relative to the wheel mount about a wheel axis; a locking assembly including a wheel mount latch connected with the standing frame, the wheel mount latch being adapted to engage and thereby rotationally lock the wheel mount with respect to the standing frame, and to disengage and thereby unlock the wheel mount so that the wheel mount is rotatable relative to the standing frame for changing an orientation of the wheel axis; an actuating assembly coupling the wheel mount latch to the handle frame so that the wheel mount latch is movable to engage and disengage the wheel mount in response to a rotation of the handle frame; and a release mechanism including an operating part, and a cable assembly coupling the operating part to the actuating assembly, wherein the cable assembly includes a flexible part configured to stretch or loosen as the handle frame rotates between the first position and the second position, the operating part being operable to cause the wheel mount latch to disengage from the wheel mount when the handle frame is in the first position.

According to another embodiment described herein, a wheeled carrying apparatus includes: a standing frame and a handle frame pivotally coupled to each other, the handle frame being rotatable relative to the standing frame between a first position and a second position of different inclinations; a first wheel mount carrying a first wheel and pivotally connected with the standing frame, the first wheel being rotatable relative to the wheel mount about a first wheel axis; a first locking assembly including a first wheel mount latch connected with the standing frame, the first wheel mount latch being adapted to engage and thereby rotationally lock the first wheel mount with respect to the standing frame, and to disengage and thereby unlock the first wheel mount so that the first wheel mount is rotatable relative to the standing frame for changing an orientation of the first wheel axis; a second wheel mount carrying a second wheel and pivotally connected with the standing frame, the second wheel being rotatable relative to the second wheel mount about a second wheel axis; a second locking assembly including a second wheel mount latch connected with the standing frame, the second wheel mount latch being adapted to engage and thereby rotationally lock the second wheel mount with respect to the standing frame, and adapted to disengage and thereby unlock the second wheel mount so that the second wheel mount is rotatable relative to the standing frame for changing an orientation of the second wheel axis; an actuating assembly respectively coupling the first wheel mount latch and the second wheel mount latch to the handle frame so that each of the first wheel mount latch and the second wheel mount latch is movable for locking engagement or unlocking disengagement in response to a rotation of the handle frame; and a release mechanism including an operating part, and a cable assembly coupling the operating part to the actuating assembly, wherein the cable assembly includes a first and a second flexible part, and the release mechanism is configured to transmit a drawing force induced by an actuation of the operating part through the first flexible part for unlocking the first wheel mount when the handle frame is in the first position, and through the second flexible part for unlocking the second wheel mount when the handle frame is in the second position.

According to another embodiment described herein, a wheeled carrying apparatus includes: a standing frame and a handle frame pivotally coupled to each other, the handle frame being rotatable relative to the standing frame between a first position and a second position of different inclinations; a wheel mount carrying a wheel and pivotally connected with the standing frame, the wheel being rotatable relative to the wheel mount about a wheel axis; a locking assembly including a wheel mount latch connected with the standing frame, the wheel mount latch being adapted to engage and thereby rotationally lock the wheel mount with respect to the standing frame, and to disengage and thereby unlock the wheel mount so that the wheel mount is rotatable relative to the standing frame for changing an orientation of the wheel axis; an actuating assembly coupling the wheel mount latch to the handle frame so that the wheel mount latch is movable to engage and disengage the wheel mount in response to a rotation of the handle frame; and a release mechanism including an operating part, and a cable assembly coupling the operating part to the wheel mount latch, wherein the operating part is operable to cause the wheel mount latch to disengage from the wheel mount when the handle frame is in the first position, and is unable to cause the wheel mount latch to disengage from the wheel mount when the handle frame is in the second position.

DETAILED DESCRIPTION OF THE EMBODIMENTS

The present application provides a wheeled carrying apparatus that includes a standing frame, and a plurality of wheel assemblies provided at a bottom of the standing frame. The wheel assemblies can be controllably locked and unlocked in horizontal orientation with respect to a standing frame, wherein an unlocked wheel assembly can rotate relative to the standing frame for changing the horizontal orientation of a wheel axis. According to the needs, some of the wheel assemblies are locked while others are unlocked, or all of the wheel assemblies can be unlocked at the same time as desired. Accordingly, the wheeled carrying apparatuses can be more flexible in use and have better maneuverability. Embodiments of the wheeled carrying apparatus described herein include child stroller apparatuses. However, it will be appreciated that wheeled carrying apparatuses that may incorporate the structures and features described herein can include, without limitation, child stroller apparatuses, trolleys, shopping carts, and the like. Accordingly, it is understood that the structures and features described herein may be generally applicable to any types of products having wheels, and the wheeled carrying apparatuses as described and claimed herein are not limited to the examples illustrated hereinafter.

Figure 1:
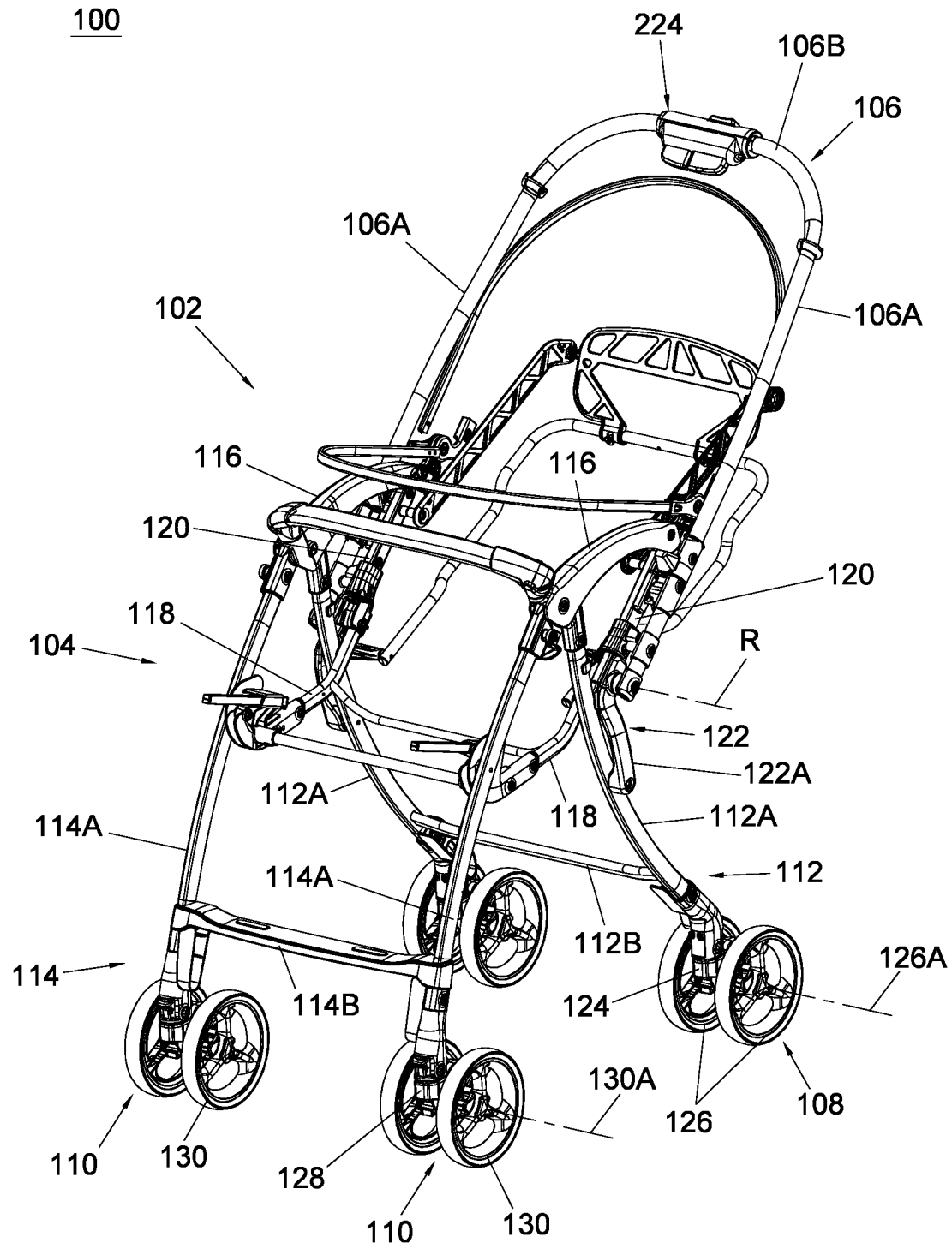
FIG. 1 is a perspective view illustrating an embodiment of a wheeled carrying apparatus.

FIG. 1 is a perspective view illustrating an embodiment of a wheeled carrying apparatus 100, which is exemplarily a child stroller apparatus. Referring to FIG. 1, the wheeled carrying apparatus 100 can include a frame structure 102 comprised of a standing frame 104 and a handle frame 106 coupled to each other, and a plurality of wheel assemblies 108 and 110 provided at a bottom of the standing frame 104.

According to an example of construction, the standing frame 104 can include two leg frames 112 and 114, two side linking bars 116, two side support bars 118 and two carrier bars 120. The leg frame 112 can be exemplarily a rear leg frame, and the leg frame 114 can be exemplarily a front leg frame. Each of the leg frames 112 and 114 can respectively include two side segments disposed symmetrically at a left and a right side of the standing frame 104, e.g., two side segments 112A for the leg frame 112 and two side segments 114A for the leg frame 114, and a transversal segment fixedly connected with the two side segments, e.g., a transversal segment 112B fixedly connected with the two side segments 112A for the leg frame 112, and a transversal segment 114B fixedly connected with the two side segments 114A for the leg frame 114. At each of the left and right sides, the side segment 112A of the leg frame 112 and the side segment 114A of the leg frame 114 can be respectively coupled pivotally to one side linking bar 116, and one side support bar 118 can extend between side segments 112A and 114A and can be pivotally coupled to the side segment 114A, whereby the leg frames 112 and 114, the side linking bars 116 and the side support bars 118 can rotate relative to one another during folding and unfolding of the wheeled carrying apparatus 100.

The handle frame 106 can be respectively coupled pivotally to the standing frame 104 at the left and right sides via two bar linkages 122, wherein each bar linkage 122 can include a bar 122A. More specifically, the handle frame 106 can include two side portions 106A disposed symmetrically at the left and right sides, and a grip portion 106B connected with the two side portions 106A. At each of the left and right sides, the carrier bar 120 can have an upper portion pivotally connected with the side linking bar 116, and a lower portion respectively connected pivotally with the side support bar 118, the bar 122A of the bar linkage 122 and the side portion 106A of the handle frame 106 about a common pivot axis R. The bar 122A of the bar linkage 122 can be respectively connected pivotally with the side segment 112A of the leg frame 112, and with the side portion 106A of the handle frame 106 about the pivot axis R. With this construction, the handle frame 106 can rotate about the pivot axis R relative to the standing frame 104 and the bar linkage 122 for adjustment between the two positions of different inclinations so that the wheeled carrying apparatus 100 can be pushed in different directions with a child facing forward or rearward. For example, the handle frame 106 can be inclined toward the side of the leg frame 112 in a first position (as shown in FIG. 1), and inclined toward the side of the leg frame 114 in a second position.

Referring to FIG. 1, each of the wheel assemblies 108 and 110 can include a wheel mount that is pivotally connected with the standing frame 104 and carries at least a wheel rotatable relative to the wheel mount about a wheel axis extending generally horizontally, whereby the wheel mount is rotatable relative to the standing frame 104 for changing an orientation of the wheel axis. For example, two wheel assemblies 108 can be provided at the lower ends of the side segments 112A of the leg frame 112, and two wheel assemblies 110 can be respectively provided at the lower ends of the two side segments 114A of the leg frame 114. Each wheel assembly 108 can include a wheel mount 124 that is pivotally connected with the leg frame 112 and carries at least a wheel 126 rotatable relative to the wheel mount 124 about a wheel axis 126A extending generally horizontally, whereby the wheel mount 124 is rotatable for changing a horizontal orientation of the wheel axis 126A. Likewise, each wheel assembly 110 can include a wheel mount 128 that is pivotally connected with the leg frame 114 and carries at least a wheel 130 rotatable relative to the wheel mount 128 about a wheel axis 130A extending generally horizontally, whereby the wheel mount 128 is rotatable for changing a horizontal orientation of the wheel axis 130A. The wheel mounts 124 are spaced apart from the wheel mounts 128 along a lengthwise axis of the wheeled carrying apparatus 100 extending from a rear to a front thereof.

Figure 2:
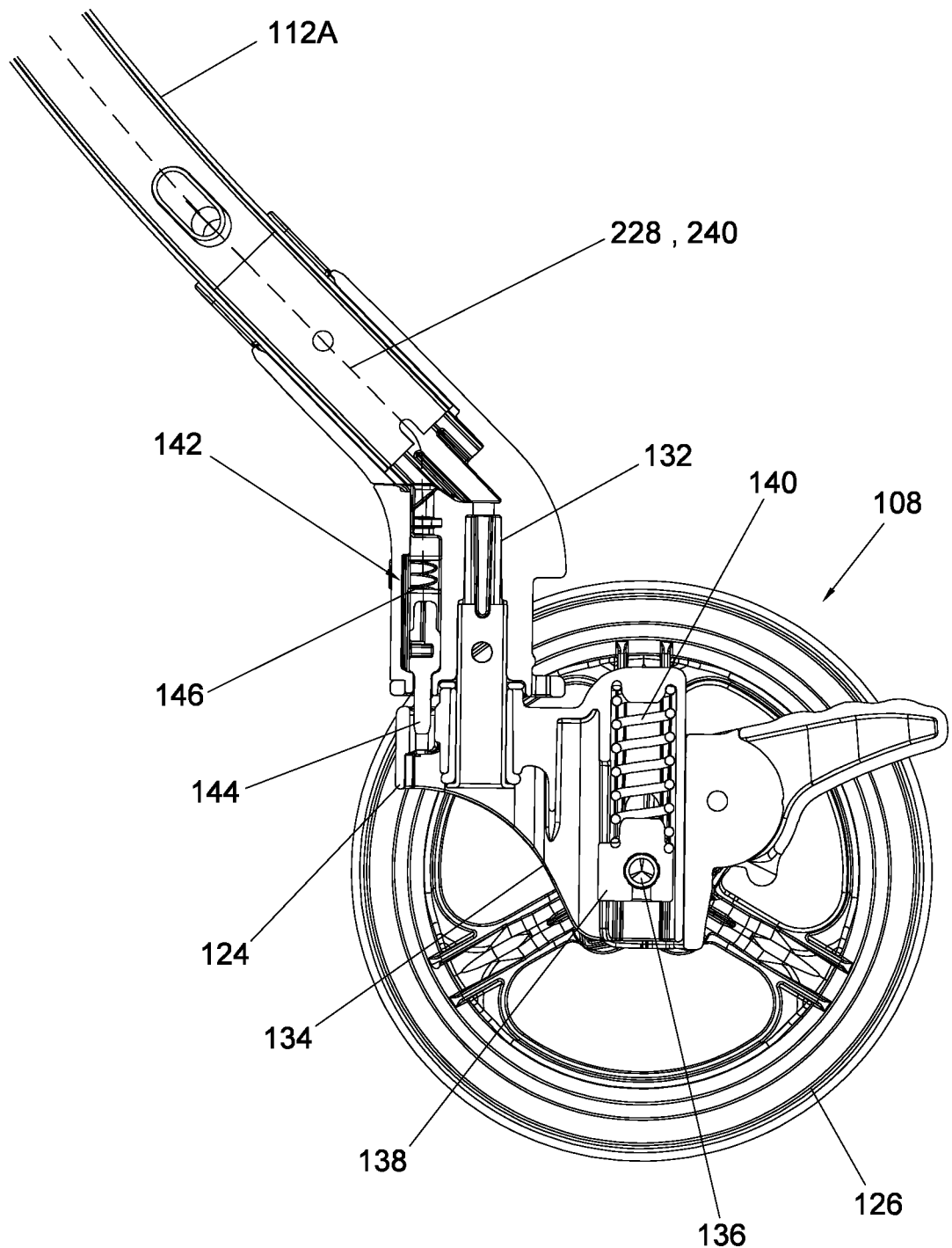
FIG. 2 is a cross-sectional view illustrating one wheel assembly provided in the wheeled carrying apparatus.

In conjunction with FIG. 1, FIG. 2 is a cross-sectional view illustrating one wheel assembly 108. Referring to FIGS. 1 and 2, the two wheel assemblies 108 can have a same construction. In each wheel assembly 108, the wheel mount 124 can be pivotally connected with the leg frame 112 about a pivot axle 132 so that the wheel mount 124 and the wheel 126 carried therewith can rotate in unison about the pivot axle 132. According to an example of construction, the wheel mount 124 can include a housing 134 that is pivotally connected with the leg frame 112 via the pivot axle 132. A wheel axle 136 defining the wheel axis 126A can be disposed through the housing 134 for pivotally connecting the wheel 126 with the wheel mount 124. According to an example of construction, the wheel axle 136 can be disposed through a sliding part 138 assembled inside the housing 134 for vertical sliding movement, and a spring 140 can be respectively connected with the sliding part 138 and the housing 134. The spring 140 can cushion a vertical displacement of the wheel 126 relative to the wheel mount 124 for dissipating undesirable shock energy during use.

Referring to FIG. 2, a locking assembly 142 is provided to rotationally lock and unlock the wheel mount 124 with respect to the standing frame 104. The locking assembly 142 can include a wheel mount latch 144 movably connected with the standing frame 104, and a locking spring 146 connected with the wheel mount latch 144. According to an example of construction, the wheel mount latch 144 can be slidably connected with the side segment 112A of the leg frame 112. More specifically, the side segment 112A can have a cavity, and the wheel mount latch 144 can have an elongate shape slidably received in the cavity of the side segment 112A, whereby the wheel mount latch 144 can slide to protrude outside the cavity or retract inward. The locking spring 146 can be disposed inside the cavity of the side segment 112A, and can have two ends respectively connected with the side segment 112A and the wheel mount latch 144. The locking spring 146 can bias the wheel mount latch 144 to protrude outward for engagement with the wheel mount 124.

In the locking assembly 142, the wheel mount latch 144 can slide downward to engage with the wheel mount 124 and thereby rotationally lock the wheel mount 124 with respect to the standing frame 104, and slide upward to disengage from the wheel mount 124 to unlock the wheel mount 124 so that the wheel mount 124 can rotate relative to the standing frame 104. The locking spring 146 can apply a biasing force for urging the wheel mount latch 144 to engage with the wheel mount 124. The same locking assembly 142 described above may be provided for each of the two wheel assemblies 108.

Figure 3:
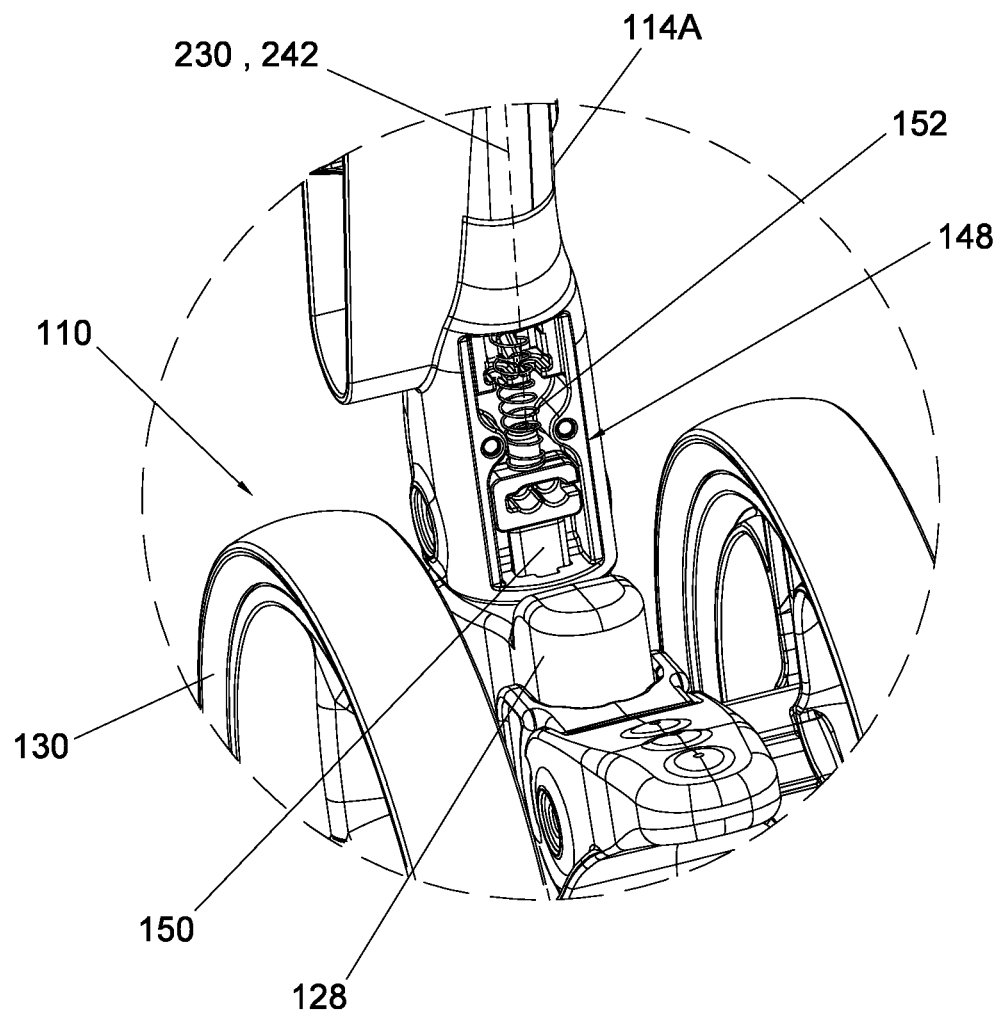
FIG. 3 is an enlarged perspective view illustrating another wheel assembly provided in the wheeled carrying apparatus.

In conjunction with FIG. 1, FIG. 3 is an enlarged perspective view illustrating one wheel assembly 110. Referring to FIGS. 1 and 3, the wheel assembly 110 can have the same construction described previously, which can include the wheel mount 128 pivotally connected with the leg frame 114 so that the wheel mount 128 and the wheel 130 carried therewith can rotate in unison relative to the leg frame 114. Moreover, a locking assembly 148 can be provided to rotationally lock and unlock the wheel mount 128 with respect to the standing frame 104. The locking assembly 148 may have a construction similar to the locking assembly 142 of the wheel assembly 108. According to an example of construction, the locking assembly 148 can include a wheel mount latch 150 movably connected with the standing frame 104, and a locking spring 152 connected with the wheel mount latch 150. For example, the wheel mount latch 150 may be slidably connected with the side segment 114A of the leg frame 114, and the locking spring 152 can have two ends respectively connected with the side segment 114A and the wheel mount latch 150. The wheel mount latch 150 can thereby slide downward to engage with the wheel mount 128 and thereby rotationally lock the wheel mount 128 with respect to the standing frame 104, and can slide upward to disengage and unlock the wheel mount 128 so that the wheel mount 128 can freely rotate relative to the standing frame 104 for changing the horizontal orientation of the wheel axis 130A. The locking spring 152 can bias the wheel mount latch 150 to engage with the wheel mount 128.

In conjunction with FIGS. 1-3, FIGS. 4-11 are schematic views illustrating further construction details of the wheeled carrying apparatus 100. Referring to FIGS. 1-11, the wheeled carrying apparatus 100 can further include an actuating assembly 220 and a release mechanism 222.

Figure 4:
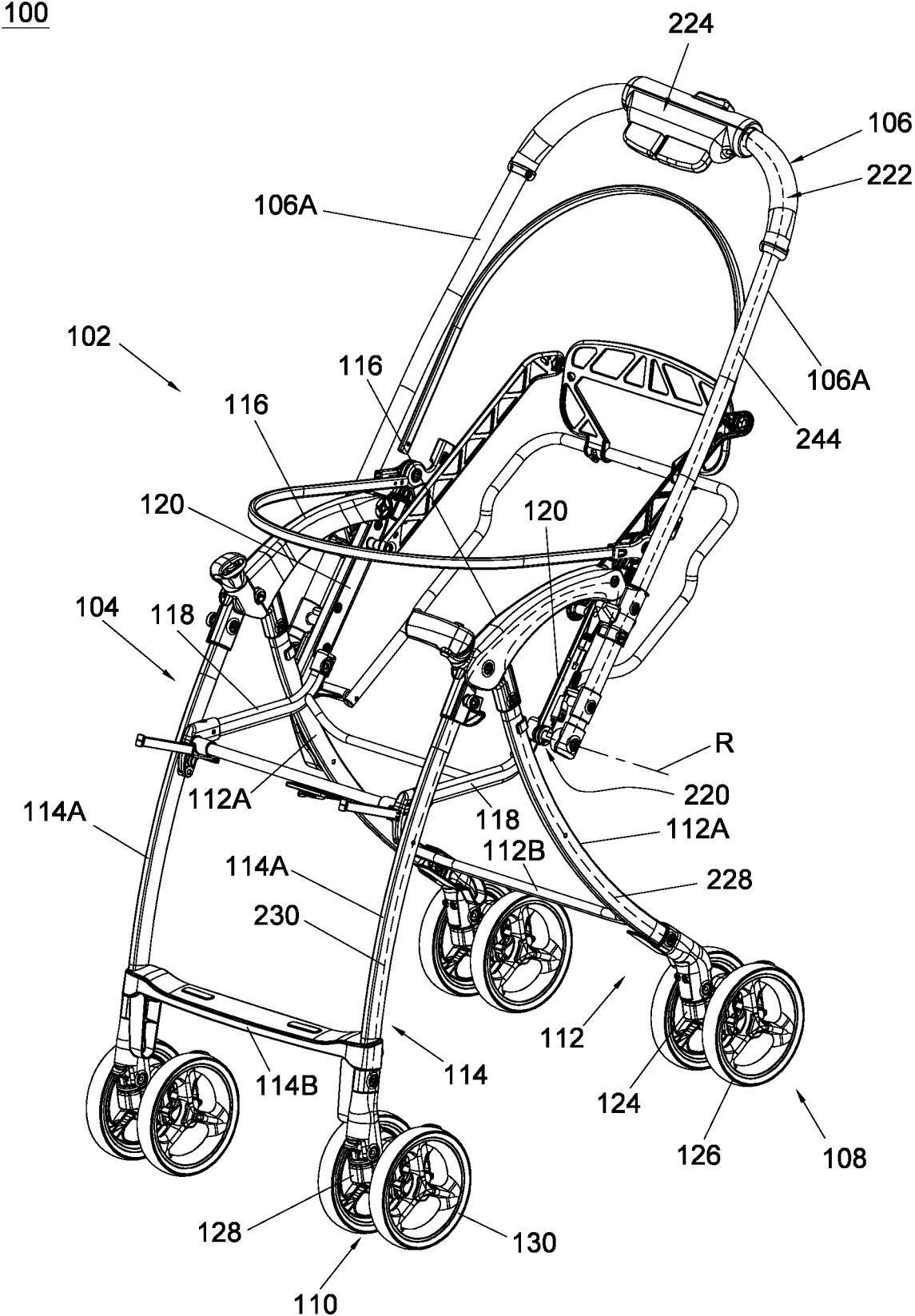
FIG. 4 is a perspective view illustrating some construction details of an actuating assembly and a release mechanism provided in the wheeled carrying apparatus.
Figure 5:
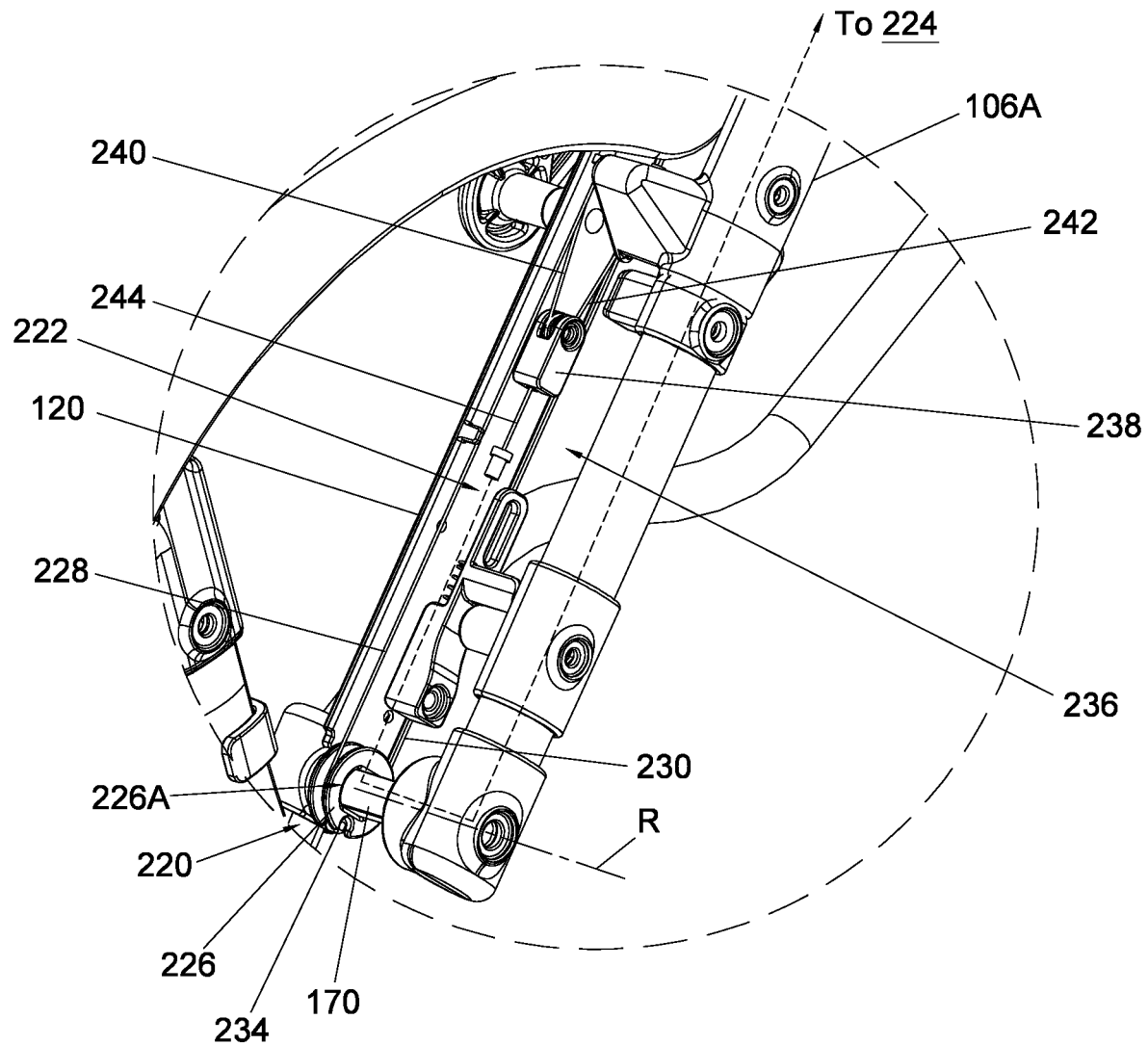
FIG. 5 is an enlarged view illustrating some construction details of the actuating assembly and the release mechanism provided in the wheeled carrying apparatus.
Figure 6:
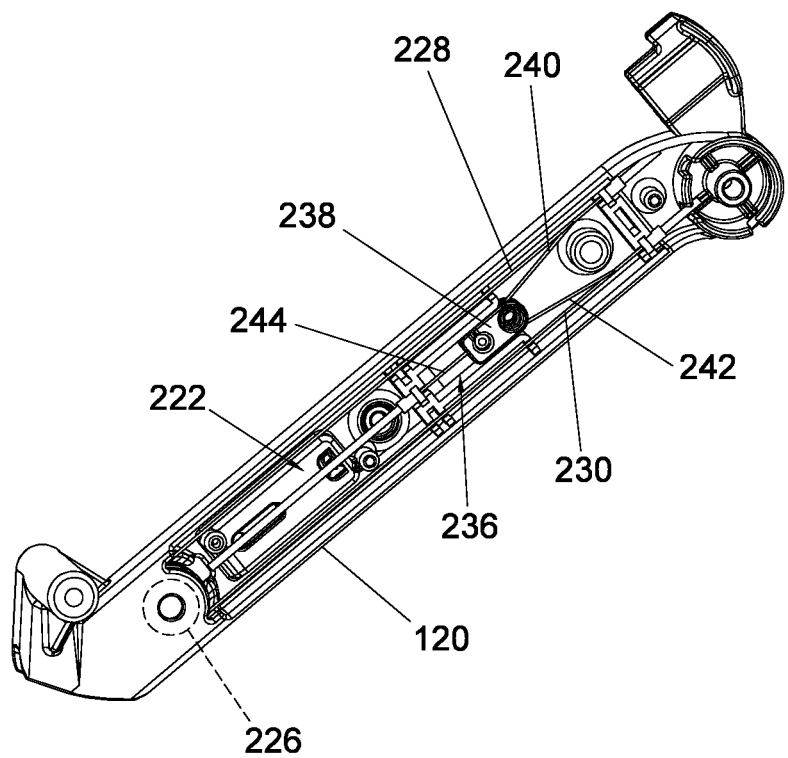
FIG. 6 is a perspective view illustrating a portion of the actuating assembly and the release mechanism on a carrier bar of the wheeled carrying apparatus.

Referring to FIGS. 1-5, the actuating assembly 220 is respectively coupled to the handle frame 106 and the wheel mount latches 144 and 150, and is operable independent of the release mechanism 222 to switch the wheel mount latches 144 and 150 between a locking and an unlocking state in accordance with the position of the handle frame 106. According to an example of construction, the actuating assembly 220 can include a link actuator 226 coupled to the handle frame 106, a linking part 228 coupling the wheel mount latch 144 to the link actuator 226, and a linking part 230 coupling the wheel mount latch 150 to the link actuator 226, the wheel mount latches 144 and 150 being respectively associated with the wheel assemblies 108 and 110 located at a same side (i.e., a left or right side) of the wheeled carrying apparatus 100. In FIG. 4, the linking parts 228 and 230 are illustrated with phantom lines.

The link actuator 226 can move in a first direction to pull the linking part 230 and urge the wheel mount latch 150 to disengage from the wheel mount 128 and concurrently relax the linking part 228 so that the wheel mount latch 144 can engage with the wheel mount 124 under the biasing force of the locking spring 146, and in a second direction opposite to the first direction to pull the linking part 228 and urge the wheel mount latch 144 to disengage from the wheel mount 124 and concurrently relax the linking part 230 so that the wheel mount latch 150 can engage with the wheel mount 128 under the biasing force of the locking spring 152. The link actuator 226 is movably linked to the handle frame 106 so that the link actuator 226 is movable in the first or second direction in response to a rotation of the handle frame 106 relative to the standing frame 104 between the first position and the second position of different inclinations. In this embodiment, the link actuator 226 can be pivotally connected with the standing frame 104 about the pivot axis R, and can rotate as a unitary part relative to the standing frame 104 in the first and second direction. According to an example of construction, the side portion 106A of the handle frame 106 can be fixedly connected with a shaft portion 170 extending along the pivot axis R, and the link actuator 226 can be disposed adjacent to the carrier bar 120 and can be rotationally coupled to the handle frame 106 by engaging the shaft portion 170 through a hole 226A provided in the link actuator 226, whereby the link actuator 226 and the handle frame 106 can rotate in unison about the pivot axis R relative to the standing frame 104. Examples of suitable structures for the link actuator 226 may include, without limitation, a rotary plate, a ring and the like.

Referring to FIGS. 1-5, the two linking parts 228 and 230 can include cable portions that are provided as separate cables or are defined from a single cable, and can be routed along the standing frame 104. Suitable cables may include any elongate and flexible structures that can be tensioned for transmitting a drawing force, which may include, without limitation, metallic cables, cords, ropes, wires, strings, bands, strips, and the like. According to an example of construction, the two linking parts 228 and 230 can respectively include two cable portions that respectively couple the wheel mount latches 144 and 150 to the link actuator 226. For example, the linking part 228 can include a cable portion that is anchored to the link actuator 226 via an attachment part 234 and has an end anchored to the wheel mount latch 144, and the linking part 230 can include a cable portion that is anchored to the link actuator 226 via the attachment part 234 and has an end anchored to the wheel mount latch 150. The linking part 228 can exemplarily extend from the wheel mount latch 144 along the side segment 112A of the leg frame 112, the side linking bar 116 and the carrier bar 120 to the link actuator 226. The linking part 230 can exemplarily extend from the wheel mount latch 150 along the side segment 114A of the leg frame 114, the side linking bar 116 and the carrier bar 120 to the link actuator 226. The linking parts 228 and 230 may extend substantially parallel to each other along the carrier bar 120.

According to an example of construction, the two linking parts 228 and 230 may be defined from a single cable that can thereby form an integral single linking part, which can be routed along the frame structure like previously described, and can have a first and a second end that are respectively anchored to the wheel mount latch 144 and the wheel mount latch 150 and an intermediate portion that loops around the link actuator 226 and is anchored to the link actuator 226 via the attachment part 234.

In the actuating assembly 220, the link actuator 226 can thus rotate along with the handle frame 106 in a first direction to pull the linking part 230 (in particular the end thereof that is anchored to the wheel mount latch 150) and thereby urge the wheel mount latch 150 to disengage and unlock the wheel mount 128 and concurrently relax the linking part 228 (in particular the end thereof that is anchored to the wheel mount latch 144) so that the wheel mount latch 144 is allowed to engage and lock the wheel mount 124. Moreover, the link actuator 226 can rotate along with the handle frame 106 in a second direction opposite to the first direction to pull the linking part 228 (in particular the end thereof that is anchored to the wheel mount latch 144) and thereby urge the wheel mount latch 144 to disengage and unlock the wheel mount 124 and concurrently relax the linking part 230 (in particular the end thereof that is anchored to the wheel mount latch 150) so that the wheel mount latch 150 is allowed to engage and lock the wheel mount 128.

Since the two wheels assemblies 108 and 110 are provided at each of the left and right side of the wheeled carrying apparatus 100, the actuating assembly 220 can be symmetrically arranged at the left and right side.

Referring to FIGS. 4-7, the release mechanism 222 can include an operating part 224 provided on the grip portion 106B of the handle frame 106. The operating part 224 is operable while the handle frame 106 is in any of the first and second position to cause the wheel mounts 124 and 128 to be unlocked at the same time. To this end, the release mechanism 222 can include a cable assembly 236 that can couple the operating part 224 to the wheel mount latches 144 and 150, whereby the operating part 224 is operable to pull the cable assembly 236 so that the wheel mount latches 144 and 150 are respectively disengaged from the wheel mounts 124 and 128 at the same time.

Figure 7:
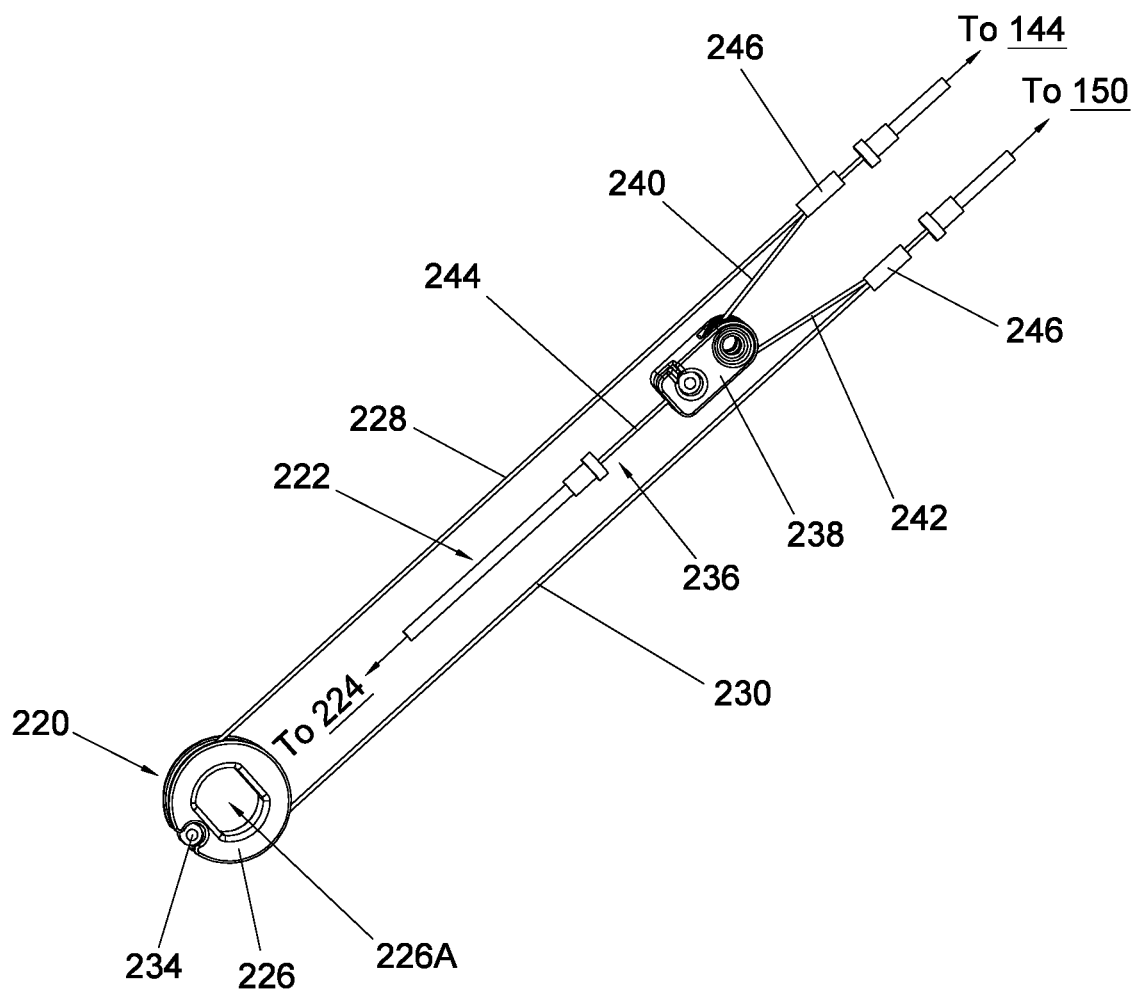
FIG. 7 is a perspective view illustrating further construction details of the actuating assembly and the release mechanism provided in the wheeled carrying apparatus.
Figure 8:
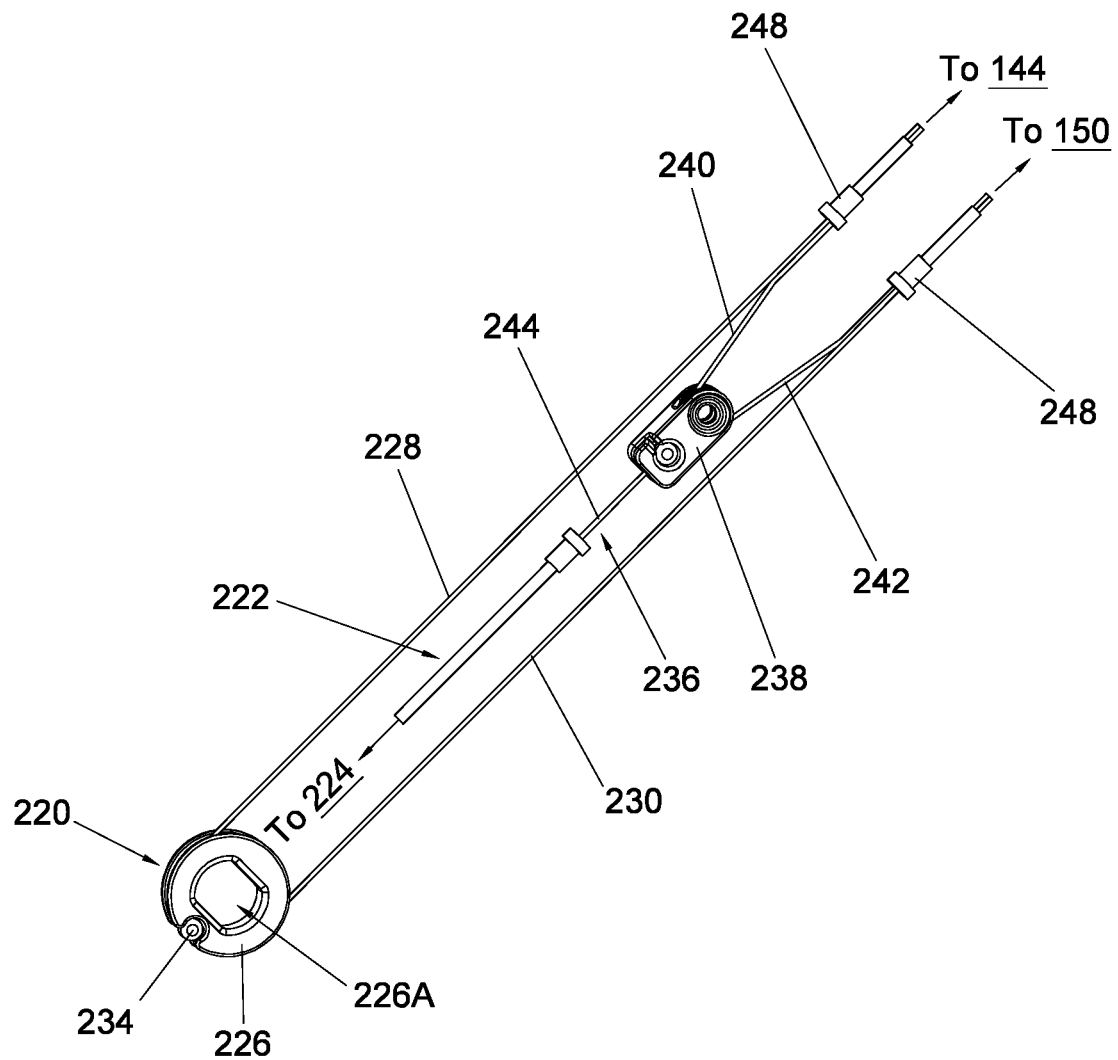
FIG. 8 is a perspective view illustrating a variant construction of the release mechanism shown in FIG. 7.
Figure 9:
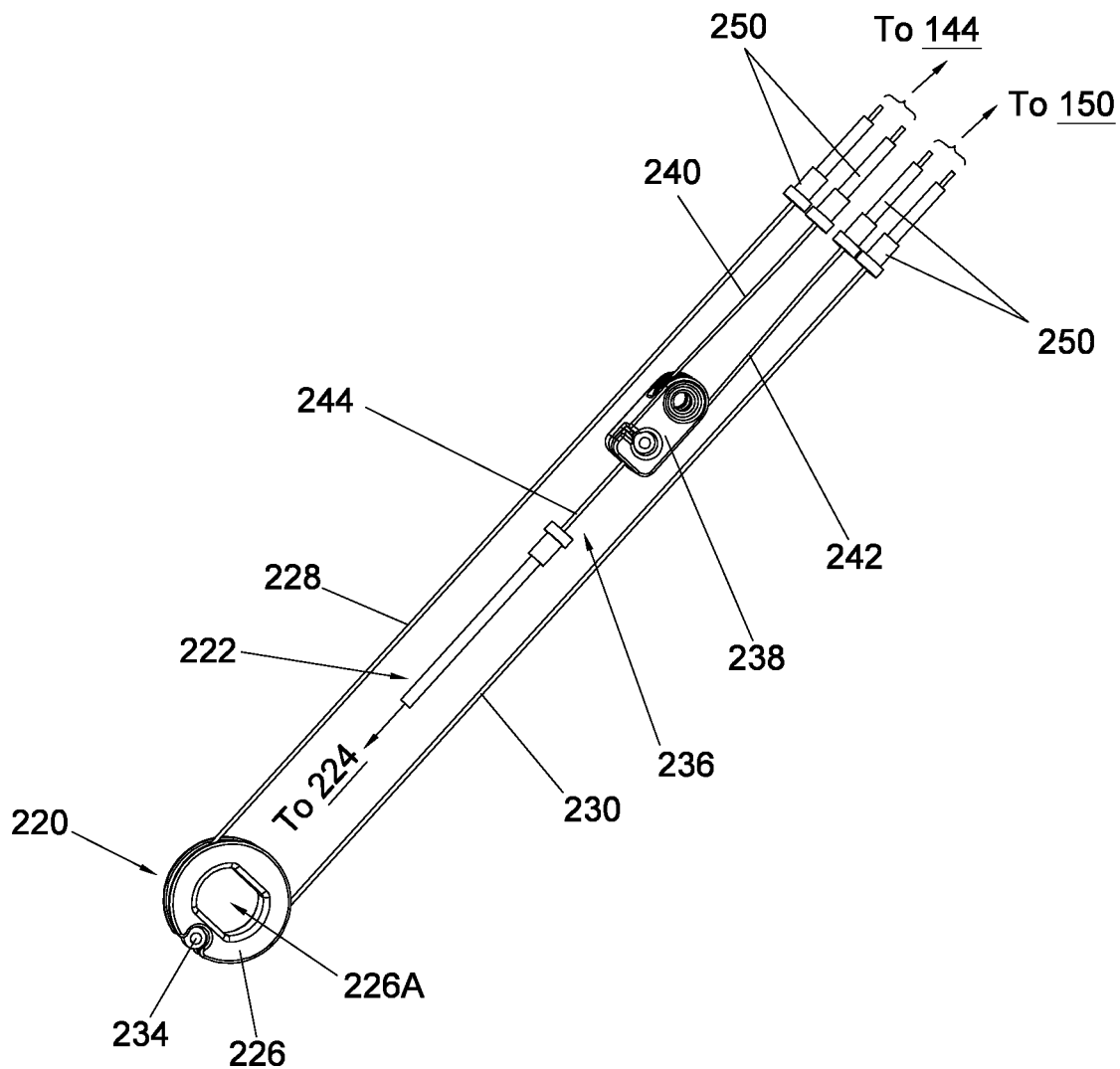
FIG. 9 is a perspective view illustrating another variant construction of the release mechanism shown in FIG. 7.

According to an example of construction, the cable assembly 236 can include a sliding part 238, two cable portions 240 and 242 connected with the sliding part 238, and a cable 244 respectively connected with the sliding part 238 and the operating part 224. The two cable portions 240 and 242 and the cable 244 can include any elongate and flexible structures that can be tensioned for transmitting a drawing force, which may include, without limitation, metallic or plastic cables, cords, ropes, wires, strings, bands, strips, and the like. The sliding part 238 can be disposed adjacent to the carrier bar 120, and can slide along a lengthwise axis of the carrier bar 120. The two cable portions 240 and 242 may be provided as two separate cables respectively connected with the sliding part 238, or defined from a single cable that contacts with and loops at the sliding part 238. The cable portion 240 can be coupled to the wheel mount latch 144, e.g., by having an end of the cable portion 240 connected with the wheel mount latch 144 or with the linking part 228 at a location between the link actuator 226 and the wheel mount latch 144. The cable portion 242 can be coupled to the wheel mount latch 150, e.g., by having an end of the cable portion 242 connected with the wheel mount latch 150 or with the linking part 230 at a location between the link actuator 226 and the wheel mount latch 150. FIG. 7 illustrates a construction in which the two cable portions 240 and 242 can be respectively attached to the linking parts 228 and 230 via two fastening members 246. FIG. 8 illustrates a variant construction in which the two cable portions 240 and 242 can respectively have two ends that are respectively connected with the wheel mount latches 144 and 150 redundantly to the linking parts 228 and 230, wherein the cable portion 240 and the linking part 228 may be guided adjacent to each other through a sleeve 248 and the cable portion 242 and the linking part 230 may be guided adjacent to each other through another sleeve 248. FIG. 9 illustrates another variant construction in which the two cable portions 240 and 242 can respectively have two ends that are respectively connected with the wheel mount latches 144 and 150 redundantly to the linking parts 228 and 230, wherein the two linking parts 228 and 230 and the two cable portions 240 and 242 may be respectively guided through four separate sleeves 250 separate from one another. In constructions where the cable portions 240 and 242 have respective ends connected with the wheel mount latches 144 and 150, the cable portions 240 and 242 may be routed along the frame structure similarly to the linking parts 228 and 230, like described previously. With the aforementioned constructions, a pulling action applied on the cable 244 can urge the sliding part 238 and the cable portions 240 and 242 in movement, which in turn respectively pull the wheel mount latches 144 and 150 to move in the unlocking direction.

Figure 10:
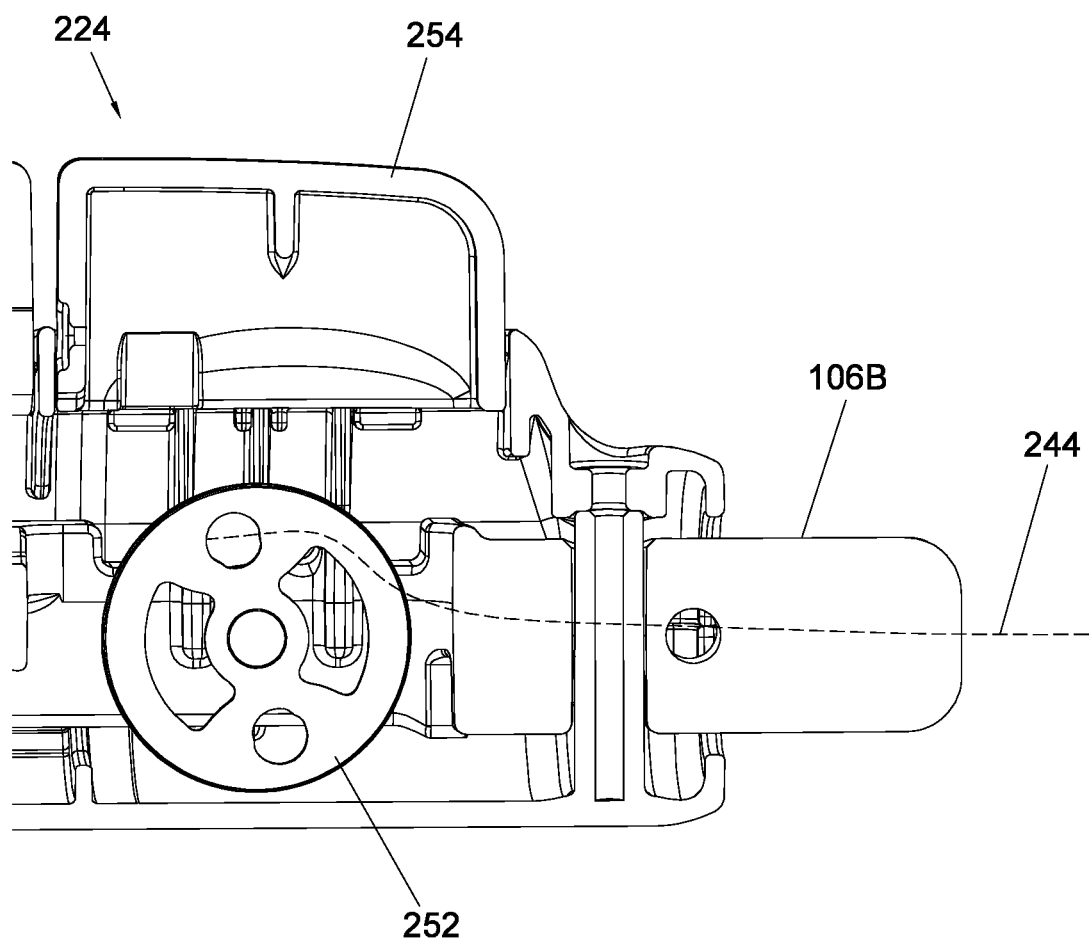
FIG. 10 is an enlarged view illustrating some construction details of an operating part provided in the release mechanism.

FIG. 10 is an enlarged view illustrating construction details of the operating part 224. Referring to FIG. 10, the operating part 224 can include a barrel 252 and a button 254. The barrel 252 can be pivotally connected with the grip portion 106B of the handle frame 106, and the cable 244 can have an end anchored to the barrel 252. The button 254 can be slidably connected with the grip portion 106B and pivotally connected with the barrel 252. With this construction, the button 254 can be pressed to urge the barrel 252 to rotate for pulling the cable 244, the sliding part 238 and the cable portions 240 and 242 in movement, which in turn can respectively pull the wheel mount latches 144 and 150 to move in the unlocking direction so that the wheel mounts 124 and 128 are unlocked at the same time.

Since the two wheels assemblies 108 and 110 are provided at each of the left and right side of the wheeled carrying apparatus 100, the release mechanism 222 can be symmetrically arranged at the left and right side and likewise coupled to the operating part 224.

In the wheeled carrying apparatus 100, the handle frame 106 can be inclined toward the side of the leg frame 112 in the first position and toward the side of the leg frame 114 in the second position. The link actuator 226 of the actuating assembly 220 can rotate along with the handle frame 106 in the first direction for pulling the linking part 230 and relaxing the linking part 228 when the handle frame 106 rotates from the second position to the first position, which can cause the wheel mount latch 150 to disengage and unlock the wheel mount 128 and cause the wheel mount latch 144 to engage and lock the wheel mount 124. Conversely, the link actuator 226 can rotate along with the handle frame 106 in the second direction for pulling the linking part 228 and relaxing the linking part 230 when the handle frame 106 rotates from the first position to the second position, which can cause the wheel mount latch 144 to disengage and unlock the wheel mount 124 and cause the wheel mount latch 150 to engage and lock the wheel mount 128.

While the handle frame 106 is in the first position and the operating part 224 is released, the wheel mount latch 144 is engaged with the wheel mount 124 to lock the wheel mount 124 to the standing frame 104, and the wheel mount latch 150 is kept disengaged from the wheel mount 128 by an initial distance so that the wheel mount 128 is unlocked for free rotation relative to the standing frame 104. For unlocking the wheel mounts 124 and 128 while the handle frame 106 is in the first position, a caregiver can actuate the operating part 224 to pull the cable assembly 236 and urge the wheel mount latch 144 to disengage from the wheel mount 124 without operation of the link actuator 226. The pulling action applied through the cable assembly 236 can also cause the wheel mount latch 150 to move further away from the wheel mount 128, so that the wheel mount latch 150 still remains disengaged from the wheel mount 128. Accordingly, the wheel mounts 124 and 128 can be unlocked at the same time in the first position of the handle frame 106.

While the handle frame 106 is in the second position and the operating part 224 is released, the wheel mount latch 150 is engaged with the wheel mount 128 to lock the wheel mount 128 to the standing frame 104, and the wheel mount latch 144 is kept disengaged from the wheel mount 124 by an initial distance so that the wheel mount 124 is unlocked for free rotation relative to the standing frame 104. For unlocking the wheel mounts 124 and 128 while the handle frame 106 is in the second position, a caregiver can actuate the operating part 224 to pull the cable assembly 236 and urge the wheel mount latch 150 to disengage from the wheel mount 128 without operation of the link actuator 226. The pulling action applied through the cable assembly 236 can also cause the wheel mount latch 144 to move further away from the wheel mount 124, so that the wheel mount latch 144 can still remain disengaged from the wheel mount 124. Accordingly, the wheel mounts 124 and 128 can be unlocked at the same time in the second position of the handle frame 106.

In conjunction with FIGS. 1-4, FIGS. 11 and 12 are two planar views illustrating another construction of the release mechanism 222 that can substitute for the release mechanisms described previously. Referring to FIGS. 1-4, 11 and 12, the release mechanism 222 can include the operating part 224, and a cable assembly 258 that can couple the operating part 224 to the wheel mount latches 144 and 150. The cable assembly 258 can include the cable 244 connected with the operating part 224 like previously described, and two flexible parts 260 and 262 connected with the cable 244. The two flexible parts 260 and 262 can include any flexible structures that can be tensioned for transmitting a drawing force, which may include, without limitation, cable portions, cords, ropes, wires, strings, bands, ribbons, strips, and the like.

The two flexible parts 260 and 262 can be connected with the cable 244 via a fastening member 264, and can be respectively connected with the linking parts 228 and 230 of the actuating assembly 220 via two fastening members 266 and 268. The actuating assembly 220 can be similar in construction and can operate like described previously. The flexible part 260 can be connected with the linking part 228 at a location between the link actuator 226 and the wheel mount latch 144, and the flexible part 262 can be connected with the linking part 230 at a location between the link actuator 226 and the wheel mount latch 150. For example, the locations where the flexible parts 260 and 262 respectively connect with the linking parts 228 and 230 can be adjacent to the carrier bar 120. According to an example of construction, the two flexible parts 260 and 262 may be provided as two separate cables. According to another example of construction, the two flexible parts 260 and 262 may be defined from a single cable. The length of the flexible part 260 between the fastening member 264 and the fastening member 266 (i.e., between the two locations where the flexible part 260 respectively connects with the cable 244 and the linking part 228) can be substantially equal to the length of the flexible part 262 between the fastening member 264 and the fastening member 268 (i.e., between the two locations where the flexible part 262 respectively connects with the cable 244 and the linking part 230). Since the flexible parts 260 and 262 can be respectively connected with the link actuator 226 via the linking parts 228 and 230, a rotation of the link actuator 226 along with the handle frame 106 can cause a relative displacement of the flexible parts 260 and 262.

As the handle frame 106 rotates relative to the standing frame 104 between the first position and the second position of different inclinations, the linking parts 228 and 230 can concurrently travel in opposite directions owing to the rotation of the link actuator 226 along with the handle frame 106, which can draw or push the flexible parts 260 and 262 to respectively move relative to the cable 244 to become tensioned or loosen. For example, the linking part 228 can urge the flexible part 260 in movement relative to the cable 244 to become tensioned when the handle frame 106 rotates from the second position to the first position, and to loosen when the handle frame 106 rotates from the first position to the second position. Conversely, the linking part 230 can urge the flexible part 262 in movement relative to the cable 244 to become tensioned when the handle frame 106 rotates from the first position to the second position, and to loosen when the handle frame 106 rotates from the second position to the first position. The tensioned one of the two flexible parts 260 and 262 can transmit a drawing force from the cable 244 through the linking part coupled thereto and thereby allows the corresponding wheel mount latch to unlock, whereas the loosened one of the two flexible parts 260 and 262 cannot transmit the drawing force through the linking part coupled thereto. Depending on whether the handle frame 106 is in the first or second position, the operating part 224 is thus operable to drive unlocking of only one of the two wheel mount latches 144 and 150 at a time on each of the left and right side.

Figure 11:
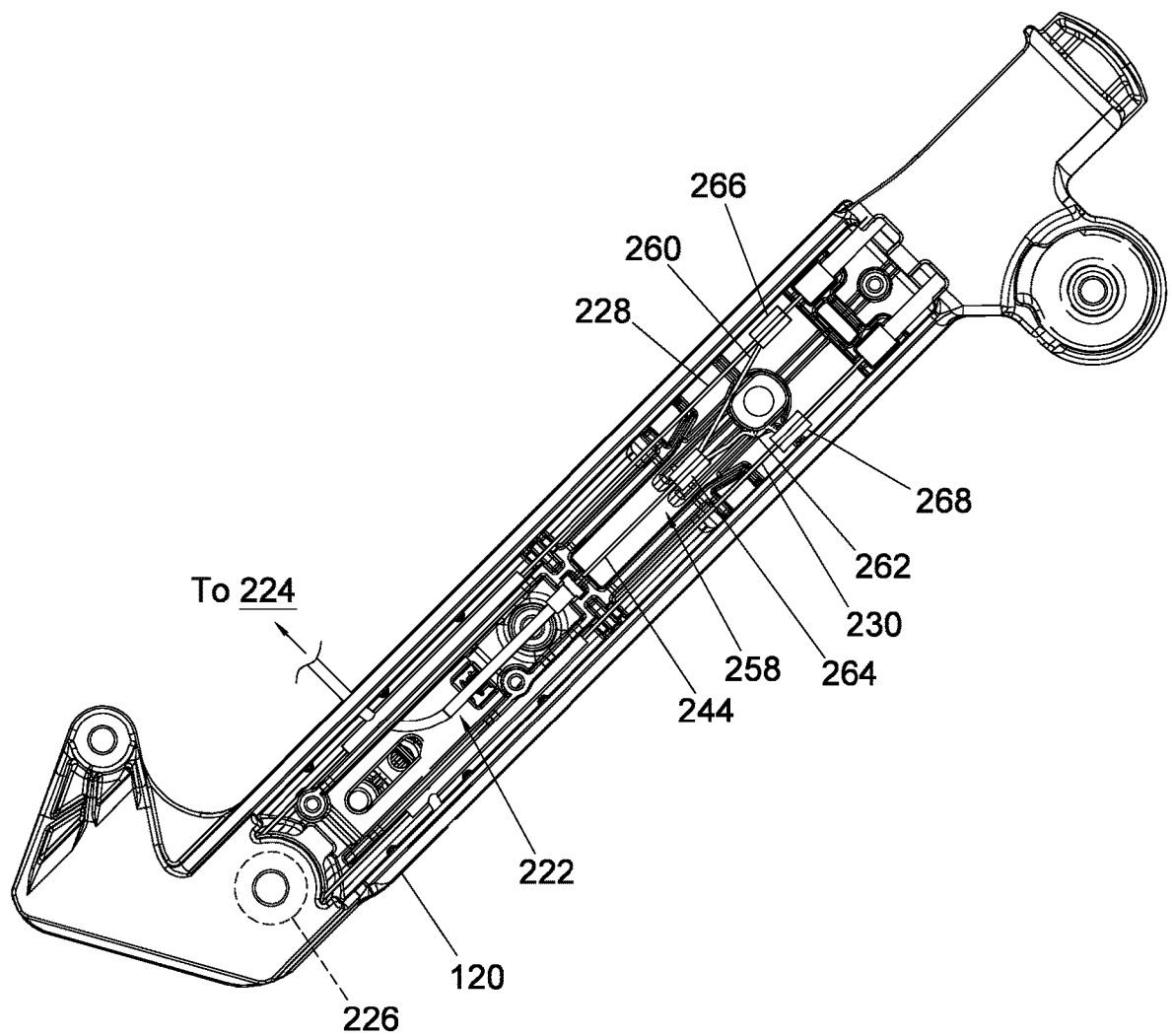
FIG. 11 is a planar view illustrating another construction of a release mechanism provided in the wheeled carrying apparatus.

In FIG. 11, the cable assembly 258 of the release mechanism 222 is shown in a configuration corresponding to the first position of the handle frame 106 inclined toward the side of the leg frame 112. While the handle frame 106 is in the first position and the operating part 224 is released, the wheel mount latch 144 is engaged with the wheel mount 124 to lock the wheel mount 124 to the standing frame 104, and the wheel mount latch 150 is kept disengaged from the wheel mount 128 by a distance so that the wheel mount 128 is unlocked for free rotation relative to the standing frame 104. Moreover, the flexible part 260 is in a tensioned state whereas the flexible part 262 is in a loosened state.

For unlocking the wheel mounts 124 and 128 while the handle frame 106 is in the first position, a caregiver can actuate the operating part 224, which exerts a drawing force that pulls the cable 244 in movement. Because the flexible part 260 is in the tensioned state, the drawing force can be substantially transmitted from the cable 244 through the flexible part 260 to the linking part 228, which can thereby urge the wheel mount latch 144 to disengage from the wheel mount 124. On the other hand, the flexible part 262 in the loosened state cannot transmit the drawing force from the cable 244 to the linking part 230, and the wheel mount latch 150 is not affected by the actuation of the operating part 224 and can remain in position disengaged from the wheel mount 128 by the same distance. Accordingly, the wheel mounts 124 and 128 can be unlocked at the same time in the first position of the handle frame 106.

Figure 12:
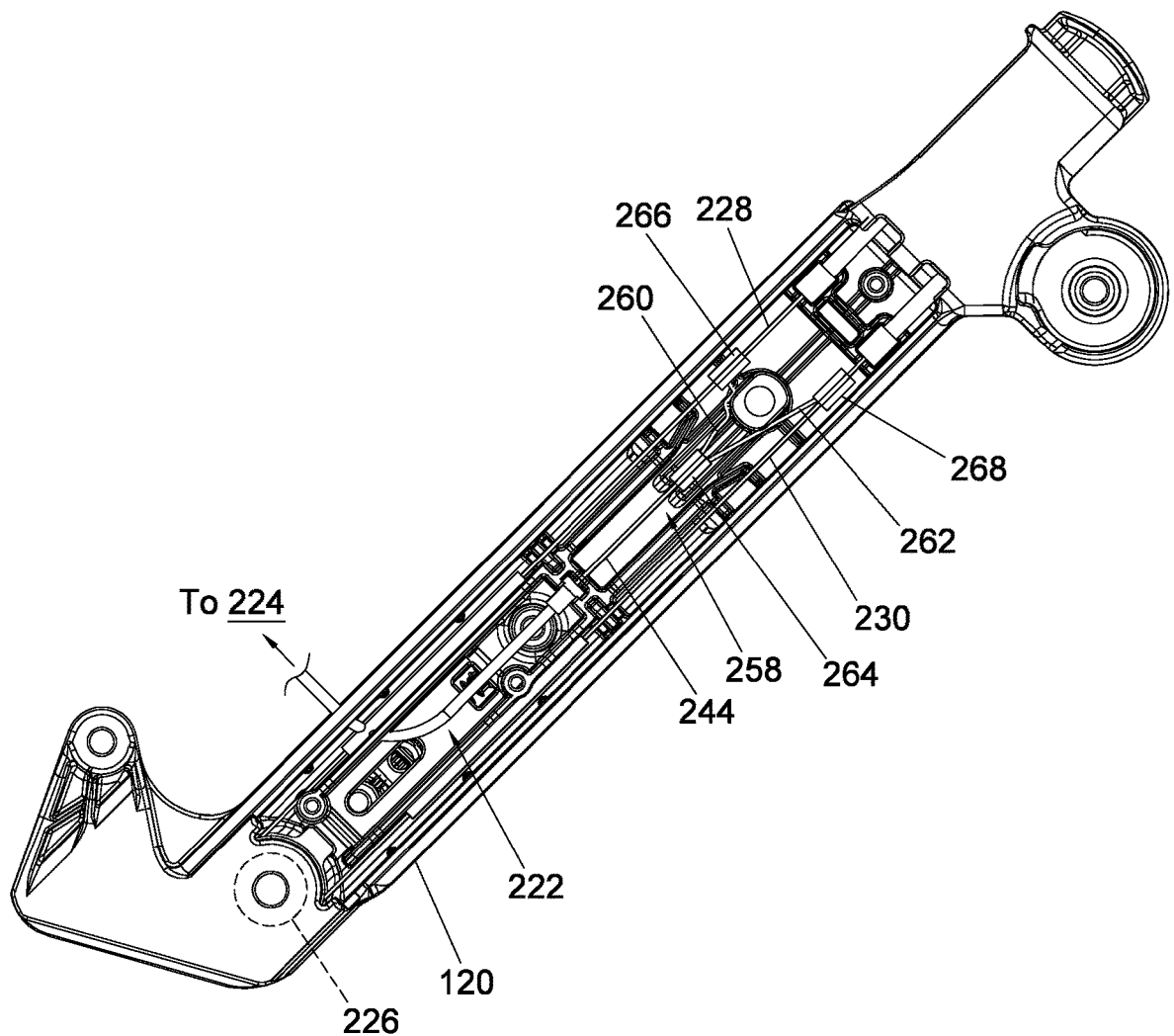
FIG. 12 is a planar view illustrating the release mechanism shown in FIG. 11 in another configuration.

In FIG. 12, the cable assembly 258 of the release mechanism 222 is shown in a configuration corresponding to the second position of the handle frame 106 inclined toward the side of the leg frame 114. While the handle frame 106 is in the second position and the operating part 224 is released, the wheel mount latch 150 is engaged with the wheel mount 128 to lock the wheel mount 128 to the standing frame 104, and the wheel mount latch 144 is kept disengaged from the wheel mount 124 by a distance so that the wheel mount 124 is unlocked for free rotation relative to the standing frame 104. Moreover, the flexible part 262 is in a tensioned state whereas the flexible part 260 is in a loosened state.

For unlocking the wheel mounts 124 and 128 while the handle frame 106 is in the second position, a caregiver can actuate the operating part 224, which exerts a drawing force that pulls the cable 244 in movement. Because the flexible part 262 is in the tensioned state, the drawing force can be substantially transmitted from the cable 244 through the flexible part 262 to the linking part 230, which can thereby urge the wheel mount latch 150 to disengage from the wheel mount 128. On the other hand, the flexible part 260 in the loosened state cannot transmit the drawing force from the cable 244 to the linking part 228, and the wheel mount latch 144 is not affected by the actuation of the operating part 224 and can remain in position disengaged from the wheel mount 124 by the same distance. Accordingly, the wheel mounts 124 and 128 can be unlocked at the same time in the second position of the handle frame 106.

Because the operating part 224 drives unlocking of only one of the two wheel mount latches 144 and 150 at a time on each of the left and right side, the actuation for having all of the wheel mounts 124 and 128 unlocked at the same time would require a driving force that is relatively smaller. Therefore, less effort would be required to actuate the operating part 224, and the component parts of the release mechanism 222 can be subjected to less mechanical stress during operation.

Advantages of the wheeled carrying apparatuses described herein include the ability to lock and unlock wheel assemblies with respect to a standing frame in a flexible manner. According to the needs, some of the wheel assemblies are locked while others are unlocked, or all of the wheel assemblies are unlocked at the same time as desired. Accordingly, the wheeled carrying apparatuses can be more flexible in use and offer better maneuverability.

Realization of the wheeled carrying apparatuses has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A wheeled carrying apparatus comprising:
a standing frame and a handle frame pivotally coupled to each other, the handle frame being rotatable relative to the standing frame between a first position and a second position of different inclinations;
a wheel mount carrying a wheel and pivotally connected with the standing frame, the wheel being rotatable relative to the wheel mount about a wheel axis;
a locking assembly including a wheel mount latch connected with the standing frame, the wheel mount latch being adapted to engage and thereby rotationally lock the wheel mount with respect to the standing frame, and to disengage and thereby unlock the wheel mount so that the wheel mount is rotatable relative to the standing frame for changing an orientation of the wheel axis;
an actuating assembly coupling the wheel mount latch to the handle frame so that the wheel mount latch is movable to engage and disengage the wheel mount in response to a rotation of the handle frame; and
a release mechanism including an operating part, and a cable assembly coupling the operating part to the actuating assembly, wherein the cable assembly includes a flexible part configured to stretch or loosen as the handle frame rotates between the first position and the second position, the operating part being operable to cause the wheel mount latch to disengage from the wheel mount when the handle frame is in the first position.

2. The wheeled carrying apparatus according to claim 1, wherein the flexible part is stretched when the handle frame is in the first position and loosens when the handle frame is in the second position.

3. The wheeled carrying apparatus according to claim 1, wherein the flexible part is stretched to be adapted to transmit a drawing force induced by an actuation of the operating part for unlocking the wheel mount.

4. The wheeled carrying apparatus according to claim 1, wherein the cable assembly further includes a cable respectively connected with the operating part and the flexible part, the flexible part being movable relative to the cable to become stretched or to loosen as the handle frame rotates between the first position and the second position.

5. The wheeled carrying apparatus according to claim 1, wherein the flexible part includes a cable portion, a cord, a rope, a wire, a string, a band, a ribbon or a strip.

6. The wheeled carrying apparatus according to claim 1, wherein the actuating assembly includes a link actuator movably linked to the handle frame, and a linking part coupling the wheel mount latch to the link actuator.

7. The wheeled carrying apparatus according to claim 6, wherein the flexible part is connected with the linking part.

8. The wheeled carrying apparatus according to claim 6, wherein the link actuator is movable in a first or a second direction in response to a rotation of the handle frame between the first position and the second position for causing the wheel mount latch to engage with or disengage from the wheel mount.

9. The wheeled carrying apparatus according to claim 6, wherein the link actuator is rotatable along with the handle frame from the second position to the first position to relax the linking part so that the wheel mount latch is allowed to engage and lock the wheel mount, and from the first position to the second position to pull the linking part and urge the wheel mount latch to disengage and unlock the wheel mount.

10. The wheeled carrying apparatus according to claim 6, wherein the handle frame is pivotally coupled to the standing frame about a pivot axis, and the link actuator is rotatable along with the handle frame about the pivot axis relative to the standing frame.

11. The wheeled carrying apparatus according to claim 1, wherein
the wheel mount defines a first wheel mount carrying a first wheel and pivotally connected with the standing frame, the first wheel being rotatable relative to the first wheel mount about a first wheel axis,
the locking assembly defines a first locking assembly including a first wheel mount latch,
the wheeled carrying apparatus further comprises:
a second wheel mount carrying a second wheel and pivotally connected with the standing frame, the second wheel being rotatable relative to the second wheel mount about a second wheel axis; and
a second locking assembly including a second wheel mount latch connected with the standing frame, the second wheel mount latch being adapted to engage and thereby rotationally lock the second wheel mount with respect to the standing frame, and adapted to disengage and thereby unlock the second wheel mount so that the second wheel mount is rotatable relative to the standing frame for changing an orientation of the second wheel axis,
the actuating assembly respectively couples the first wheel mount latch and the second wheel mount latch to the handle frame so that each of the first wheel mount latch and the second wheel mount latch is movable for locking engagement or unlocking disengagement in response to a rotation of the handle frame,
the flexible part includes a first and a second flexible part, and
the release mechanism is configured to transmit a drawing force induced by an actuation of the operating part through the first flexible part for unlocking the first wheel mount when the handle frame is in the first position, and through the second flexible part for unlocking the second wheel mount when the handle frame is in the second position.

12. The wheeled carrying apparatus according to claim 11, wherein the first flexible part and the second flexible part are alternately stretched or loosened as the handle frame rotates between the first position and the second position.

13. The wheeled carrying apparatus according to claim 11, wherein the first flexible part loosens and is unable to transmit a drawing force induced by an actuation of the operating part when the handle frame is in the second position, and the second flexible part loosens and is unable to transmit a drawing force induced by an actuation of the operating part when the handle frame is in the first position.

14. The wheeled carrying apparatus according to claim 11, wherein the cable assembly further includes a cable respectively connected with the operating part and the first and second flexible parts, each of the first and second flexible part being movable relative to the cable to become stretched or to loosen as the handle frame rotates between the first position and the second position.

15. The wheeled carrying apparatus according to claim 11, wherein any of the first and second flexible part includes a cable portion, a cord, a rope, a wire, a string, a band, a ribbon or a strip.

16. The wheeled carrying apparatus according to claim 11, wherein the actuating assembly includes a link actuator movably linked to the handle frame, a first linking part coupling the first wheel mount latch to the link actuator, and a second linking part coupling the second wheel mount latch to the link actuator.

17. The wheeled carrying apparatus according to claim 16, wherein the first flexible part is connected with the first linking part, and the second flexible part is connected with the second linking part.

18. The wheeled carrying apparatus according to claim 16, wherein the handle frame is pivotally coupled to the standing frame about a pivot axis, and the link actuator is rotatable along with the handle frame about the pivot axis relative to the standing frame.

19. The wheeled carrying apparatus according to claim 16, wherein the link actuator is rotatable along with the handle frame from the second position to the first position to relax the first linking part and meanwhile pull the second linking part, and from the first position to the second position to pull the first linking part and meanwhile relax the second linking part.

20. The wheeled carrying apparatus according to claim 16, wherein the first and second linking parts are defined from a single cable that is attached to the link actuator.

21. A wheeled carrying apparatus comprising:
a standing frame and a handle frame pivotally coupled to each other, the handle frame being rotatable relative to the standing frame between a first position and a second position of different inclinations;
a wheel mount carrying a wheel and pivotally connected with the standing frame, the wheel being rotatable relative to the wheel mount about a wheel axis;
a locking assembly including a wheel mount latch connected with the standing frame, the wheel mount latch being adapted to engage and thereby rotationally lock the wheel mount with respect to the standing frame, and to disengage and thereby unlock the wheel mount so that the wheel mount is rotatable relative to the standing frame for changing an orientation of the wheel axis;
an actuating assembly coupling the wheel mount latch to the handle frame so that the wheel mount latch is movable to engage and disengage the wheel mount in response to a rotation of the handle frame; and
a release mechanism including an operating part, and a cable assembly coupling the operating part to the wheel mount latch, wherein the operating part is operable to cause the wheel mount latch to disengage from the wheel mount when the handle frame is in the first position, and is unable to cause the wheel mount latch to disengage from the wheel mount when the handle frame is in the second position.

22. The wheeled carrying apparatus according to claim 21, wherein the actuating assembly includes a link actuator movably linked to the handle frame, and a linking part coupling the wheel mount latch to the link actuator.

23. The wheeled carrying apparatus according to claim 22, wherein the link actuator is rotatable along with the handle frame from the second position to the first position to relax the linking part so that the wheel mount latch is allowed to engage and lock the wheel mount, and from the first position to the second position to pull the linking part and urge the wheel mount latch to disengage and unlock the wheel mount.

24. The wheeled carrying apparatus according to claim 22, wherein the cable assembly includes a cable portion connected with the linking part or the wheel mount latch.

25. The wheeled carrying apparatus according to claim 21, wherein the cable assembly includes a flexible part configured to stretch or loosen as the handle frame rotates between the first position and the second position.

26. The wheeled carrying apparatus according to claim 25, wherein the cable assembly further includes a cable respectively connected with the operating part and the flexible part, the flexible part being movable relative to the cable to become stretched or to loosen as the handle frame rotates between the first position and the second position.

27. The wheeled carrying apparatus according to claim 25, wherein the actuating assembly includes a link actuator movably linked to the handle frame, and a linking part that couples the wheel mount latch to the link actuator and is connected with the flexible part, the flexible part being drawn or pushed in movement by the linking part to become stretched or to loosen as the handle frame rotates between the first position and the second position.

* * * * *